United States Patent [19]

Edwards et al.

[11] 4,199,620

[45] Apr. 22, 1980

[54] METHOD FOR PROVIDING MIRROR SURFACES WITH PROTECTIVE STRIPPABLE POLYMERIC FILM

[75] Inventors: Charlene C. Edwards, Powell; Jack R. Day, Oak Ridge, both of Tenn.

[73] Assignee: The United States of America as represented by the United States Department of Energy, Washington, D.C.

[21] Appl. No.: 24,340

[22] Filed: Mar. 27, 1979

[51] Int. Cl.$^2$ .............................................. B65B 33/02
[52] U.S. Cl. ......................................... 427/156; 134/4; 428/425.8; 428/687
[58] Field of Search ....................... 427/154, 155, 156; 428/425; 134/4

[56] References Cited

U.S. PATENT DOCUMENTS 2,802,595  8/1957  Veitch .................................. 427/156

FOREIGN PATENT DOCUMENTS 51-26943  3/1976  Japan ...................................... 427/156

Primary Examiner—Sam Silverberg
Attorney, Agent, or Firm—R. V. Lupo; Stephen D. Hamel; Fred O. Lewis

[57] ABSTRACT

This invention is a method for forming a protective, strippable, elastomeric film on a highly reflective surface. The method is especially well suited for protecting diamond-machined metallic mirrors, which are susceptible not only to abrasion and mechanical damage but also to contamination and corrosion by various fluids. In a typical use of the invention, a diamond-machined copper mirror surface is coated uniformly with a solution comprising a completely polymerized and completely cured thermoplastic urethane elastomer dissolved in tetrahydrofuran. The applied coating is evaporated to dryness, forming a tough, adherent, impermeable, and transparent film which encapsulates dust and other particulates on the surface. The film may be left in place for many months. When desired, the film may be stripped intact, removing the entrapped particulates and leaving no residue on the mirror surface.

5 Claims, No Drawings

METHOD FOR PROVIDING MIRROR SURFACES WITH PROTECTIVE STRIPPABLE POLYMERIC FILM

BACKGROUND OF THE INVENTION

This invention was made in the course of, or under, a contract with the U.S. Department of Energy.

The invention relates generally to methods for the formation of protective polymeric coatings on mirror surfaces and more particularly to a novel method for forming on a mirror surface a dry protective polymeric film which is strippable from the surface. As used herein, the term "strippable" is used to refer to films which can be peeled intact.

This invention is an outgrowth of a program directed to the fabrication of high-quality metallic mirrors for the reflection of laser beams. The typical metallic mirror comprised an aluminum substrate, one of whose surfaces was electroplated with copper and then diamond-machined to provide an extremely smooth and highly reflective copper surface. Protection of the machined copper surfaces posed a problem, since such surfaces are susceptible to contamination and corrosion by reactions involving various gases and liquids (e.g., moisture or oil) and to abrasion and mechanical damage. Furthermore, when such surfaces are used as laser-beam reflectors, dust particles or foreign films thereon become localized absorbers for the high-energy laser light. The localized absorbers not only reduce the reflectivity of the mirror but also may become chemically active sites, inducing damaging corrosion of the reflective surface.

Thus, a method was needed for forming on the machined copper surface a dry, tough, adherent, and impermeable protective film which would be compatible with the surface for long periods (e.g. twenty months or more) and which could be readily stripped therefrom in one piece without leaving any objectionable residue. A decision was made to evaluate liquid compositions which could be applied to the reflective surface as a liquid coating and then evaporated to dryness to form the desired film. Many liquid compositions were evaluated, but prior to the present invention none was found which was highly satisfactory. The following are examples of some of the liquid compositions which were evaluated but found deficient with regard to one or more of the properties mentioned above: nylon/alcohol (nylon dissolved in alcohol); polyvinylidene chloride/alcohol; polyvinyl alcohol/water; two-component (reactive) polyurethane; and a commercial vinyl chloride/vinyl acetate coating composition.

OBJECTS OF THE INVENTION

Accordingly, it is an object of this invention to provide a novel method for forming a dry, protective and adherent polymeric film on mirror surfaces.

It is still another object to form on glass or metallic surfaces a non-reactive polymeric-film which is relatively tough, tear-resistant, and impermeable to fluids.

It is another object to provide a method for forming on a mirror surface a transparent protective urethane film which is compatible therewith and which can be stripped therefrom intact, leaving essentially no residue.

It is another object to provide a method for forming on a glass or metallic surface a protective film which encapsulates dust and other particulate matter thereon, so that subsequent stripping of the film removes the particulate matter from the surface.

SUMMARY OF THE INVENTION

The invention may be summarized as follows: A method for forming on a mirror surface a protective dry elastomeric film which is nonreactive therewith and strippable intact therefrom, said method comprising: applying to said surface as a coating a liquid composition comprising 5 to 11% by weight of a completely reacted and completely cured thermoplastic urethane elastomer, 72 to 95% by weight tetrahydrofuran, and 0 to 17% by weight of an alcohol selected from the group consisting of methyl, ethyl, and isopropyl alcohols, and evaporating said coating to dryness.

DESCRIPTION OF THE PREFERRED EMBODIMENT

This invention is broadly applicable to the formation of protective, strippable films on substrates, (e.g. glass, copper, silver, gold, electroless nickel). For brevity, it will be illustrated herein as applied to the formation of such films on diamond-machined copper surfaces.

We have found that a protective film can be formed on diamond-machined copper surfaces by coating them with a specially designed polymer/solvent solution and then evaporating the same to dryness. Subsequently, the film can be easily stripped away. The formation of the film and its subsequent removal do not impair the reflective properties of the surface, but rather, may improve the reflective quality of the surface by removing particulates therefrom. A protective film of the desired thickness may be formed in a single coating operation or in a plurality of such operations.

We have found that it is essential that the polymer/solvent solution be prepared with a thermoplastic urethane elastomer which has been completely polymerized and completely cured in order to avoid a reduction in the quality of the mirror surface. The elastomer may, for example, be "Pellethane 2352-70AX (manufactured by Upjohn Company, CPR Division) or the equivalent. That elastomer (molecular weight approximately 2000; density, 1.1 g/cm$^3$) is characterized by high tensile and tear strength; high elongation; low gas-permeability; and good resistance to oils, ozone, and non-polar solvents. Because that elastomer is hydroscopic, preferably it is dried before use. Such drying permits accurate weighing and the formation of a "dry" film if the liquid solution is applied under "dry" conditions (e.g., <10% relative humidity. The resulting film will equilibrate with moisture in the ambient atmosphere but may be isolated therefrom by applying one or more coatings of any suitable material serving as a moisture barrier. One such material is Saran (polyvinylidene chloride).

The solvent for the elastomer preferably is tetrahydrofuran (THF). In one form of the invention the polymeric solution consists essentially of the selected elastomer and solvent. In another form, a selected alcohol is incorporated in the elastomer/THF solution to reduce its viscosity to control its evaporation rate and restrict bubble formation in the film. The following example illustrates the invention in its two-component form.

EXAMPLE 1

In accordance with the invention, a liquid solution was prepared for coating a highly reflective copper surface. The solution—consisting of 11% of a completely polymerized, completely cured thermoplastic urethane elastomer and 89% THF (percentages based on weight of solution)—was prepared as follows: A batch of "Pellethane 2352-70AX" (density, 1.1 g/cm$^3$) was maintained at 66° C. for 18 hours to ensure that it was essentially anhydrous. Fifty grams of the dried elastomer was added gradually to 400 grams of THF (density, 0.89 g/cm$^3$) at its reflux temperature (65°–66° C.), and the mixture was stirred for about 2 hours until all of the elastomer dissolved. The resulting solution was cooled to room temperature while stirred and then was sealed in predried bottles for storage.

The reflective surface of a mirror for reflecting a CO$_{2\text{-}laser}$ beam was cleaned before being coated with the stored solution. The mirror comprised an aluminum substrate, a flat surface of which had been electroplated with copper. The copper plating then had been dimaond-machined to provide an ultra-smooth mirror finish (maximum surface irregularity, peak-to-valley, of about 2 microinches). The machined copper surface was of flat circular shape and had a diameter of 1.5". Just before application of the solution, the copper surface was cleaned by rinsing with inhibited 1—1—1 trichloroethylene and then with electronic-grade Freon-113. The elastomer/THF solution was poured onto the cleaned copper surface and permitted to overflow the edges, uniformly coating the surface. The applied liquid coating was permitted to evaporate to dryness at room temperature, i.e., the coating was left undisturbed for about 24 hours.

The resulting film which was transparent and adherent was stripped manually from the copper surface, the film being sufficiently tear-resistant to be removable as a single piece. The exposed mirror surface was examined carefully with an electron microscope and an ionmicroprobe mass analyzer. No discoloration, organic or inorganic residues, or film fragments were detected. The stripped film, having a thickness of <1/16", was resilient and impermeable. Examination of the stripped film showed that it contained some bubbles; however, the typical bubble was surrounded by sound polymer. (The formation of many bubbles at the mirror/solution interface is objectionable because of the possibility of tearing thin bubble surfaces at the interface of the film and mirror. As mentioned, however, no detectable residues were found on the mirror.)

These findings were confirmed by additional tests conducted with similar copper surfaces and various Pellethane/THF liquid solutions. In some of the tests, the mirror surface was not cleaned prior to application of the coating solution. These tests demonstrated that the liquid coating encapsulated various particulate contaminants, such as fingerprints and dust, which were ultimately removed with the stripped-off film. Thus, our method can be employed not only to protect sensitive mirror surfaces but also to clean such surfaces prior to use. It was noted that drying occurs throughout the freshly applied coating uniformly; as a result, bubble formation takes place principally in a region away from the mirror surface. Long-term tests showed that urethane films formed as described will protect diamond-machined copper surfaces from a typical chemical laboratory environment for at least a year, with no adverse effect on the reflective properties of the surface.

EXAMPLE 2

In this experiment, a selected alcohol was incorporated in a solution of the above-mentioned Pellethane and THF to reduce the viscosity and evaporation rate of the solution. The resulting three-component solution comprised 7.5% urethane, 75.8% THF, and 16.7% isopropyl alcohol. This system was prepared by first forming a urethane/THF solution by the procedures described above. Just prior to use, the solution was diluted with the required amount of the alcohol. The three-component solution was applied to a diamond-machined copper surface and permitted to evaporate to dryness. The resulting dry film exhibited the characteristics referred to Example 1. Addition of the alochol had the effects of lowering the viscosity of the solution, reducing bubble formation and slowing the evaporation rate. After the film had been stripped off intact, examination of the copper surface by transmission electron microscopy showed that formation and stripping of the protective film had not impaired the objective properties of the mirror.

Referring to our invention more generally, the thermoplastic urethane elastomer to be incorporated in our liquid coating composition should be completely polymerized and completely cured to preclude chemical reactions occurring on or about the mirror surface; such reactions impair the quality of diamond-machined surfaces. Preferably, the elastomer is characterized by high elongation (e.g. >400%) and a tear strength in the range of from about 450 to 700 lbs/linear inch (ASTM D624). This promotes strippability as one piece. It is also preferable that the elastomer be produced by a thermally reversible cross-linking type of cure of the original reactive components. The elastomer used in Example 1 and 2 meets these criteria.

Referring to the solvent component, we prefer to use tetrahydrofuran because it is non-reactive with the copper surface and because of its solvent properties not only for urethane but for potential organic contaminants on the mirror surface, such as oily or polar materials. Referring to the optional component, suitable alcohols may be categorized as being short-chain alcohols, three examples of which are methyl, ethyl, and isopropyl alcohol.

Referring to our liquid composition for forming a protective film on diamond-machined copper surfaces or other mirror surfaces susceptible to damage by abrasion or corrosion, acceptable protective films may be obtained with a composition comprising from about 5 to 11% elastomer, 72 to 95% tetrahydrafuran, and 0 to 17% alcohol. As the amount of elastomer is reduced below the specified lower limit, the protective film tends to be too thin for removal in one piece. As the amount of elastomer is increased beyond the upper limit, the film tends to become a gel.

In Examples 1 and 2, above, the elastomer was dissolved in the THF at the reflux temperature of the latter. A still more suitable technique is to pour the desired amount of elastomer into the desired amount of THF and then roll or tumble the container at room temperature until dissolution is complete. Because THF is flammable, conventional safety precautions for flammable liquids should be observed.

The preferred method for applying a coating of our liquid solution to a mirror surface is to provide the surface with a peripheral dam and to rock (nutate) the mirror surface while the desired amount of solution is poured on the central portion thereof. This technique is suitable for planar and non-planar mirror surfaces. If desired, however, the solution may be applied by spraying or brushing. The applied coating may be evaporated to dryness with or without forced drying. Forced drying should be carefully controlled to avoid causing bubbling or thermally induced surface reactions.

Being transparent, our film makes it possible to inspect the underlying mirror surface at any time.

What is claimed is:

1. A method for forming on a diamond-machined metallic surface having a given reflectivity a dry, impermeable, transparent elastomeric film which can be formed on said surface and stripped intact therefrom without substantially altering said reflectivity, said method comprising:

applying to said surface as a coating a liquid composition comprising (a) 5 to 11% by weight of a completely polymerized and completely cured thermoplastic urethane elastomer characterized by an elongation of at least 400%; (b) 72 to 95% by weight tetrahydrofuran; and (c) 0 to 17% by weight of an alcohol selected from the group consisting of methyl, ethyl, and isopropyl alcohols, and evaporating said coating or dryness.

2. The method of claim 1 wherein said elastomer is characterized by a tear strength in the range of from 450 to 750 lbs/linear-inch.

3. The method of claim 1 wherein said evaporating step is conducted at ambient temperature.

4. The method of claim 1 wherein said coating is prepared with substantially anhydrous elastomer.

5. The method of claim 1 wherein said alcohol is isopropyl alcohol.

* * * * *